(12) United States Patent
Nakanishi

(10) Patent No.: US 10,745,561 B2
(45) Date of Patent: Aug. 18, 2020

(54) FILLER FOR HEAT TRANSFER MEMBER AND HEAT TRANSFER MEMBER

(71) Applicant: TOYOTA JIDOSHA KABUSHIKI KAISHA, Toyota-shi, Aichi-ken (JP)

(72) Inventor: Koji Nakanishi, Konan (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 79 days.

(21) Appl. No.: 16/150,920

(22) Filed: Oct. 3, 2018

(65) Prior Publication Data

US 2019/0106572 A1 Apr. 11, 2019

(30) Foreign Application Priority Data

Oct. 10, 2017 (JP) ................. 2017-197025

(51) Int. Cl.
| | |
|---|---|
| C08J 5/10 | (2006.01) |
| C08K 9/02 | (2006.01) |
| C08L 83/04 | (2006.01) |
| C08J 9/00 | (2006.01) |
| C08L 75/04 | (2006.01) |
| C08L 21/00 | (2006.01) |
| C08L 27/12 | (2006.01) |
| C08K 3/08 | (2006.01) |
| C08K 3/38 | (2006.01) |

(52) U.S. Cl.
CPC ............... *C08L 83/04* (2013.01); *C08J 5/10* (2013.01); *C08J 9/0066* (2013.01); *C08K 9/02* (2013.01); *C08L 21/00* (2013.01); *C08L 27/12* (2013.01); *C08L 75/04* (2013.01); *C08K 2003/085* (2013.01); *C08K 2003/385* (2013.01)

(58) Field of Classification Search
None
See application file for complete search history.

(56) References Cited

U.S. PATENT DOCUMENTS

| | | | | |
|---|---|---|---|---|
| 2012/0248595 A1* | 10/2012 | Or-Bach | ............. | H01L 21/6835 257/706 |
| 2014/0039076 A1* | 2/2014 | Katayama | .......... | C08G 18/6674 521/84.1 |
| 2019/0106572 A1* | 4/2019 | Nakanishi | ............... | C08L 83/04 |

FOREIGN PATENT DOCUMENTS

| | | | |
|---|---|---|---|
| JP | 2003-174127 A | | 6/2003 |
| JP | 2003174127 A | * | 6/2003 |
| JP | 2015-073067 A | | 4/2015 |
| JP | 2015-105282 A | | 6/2015 |
| WO | 2013/042611 A1 | | 3/2013 |

\* cited by examiner

*Primary Examiner* — Peter A Salamon
(74) *Attorney, Agent, or Firm* — Sughrue Mion, PLLC

(57) ABSTRACT

A filler for a heat transfer member includes: a core material which is made of an inorganic material or metal material having a thermal conductivity of 15 W/mK or more, and transfers heat; and an insulating film which includes a silicon oxide film and a diamond-like carbon film having electrical insulation properties, and covers the core material. The dielectric breakdown voltage of the filler is 500 V or more.

4 Claims, 9 Drawing Sheets

FILLER FOR HEAT TRANSFER MEMBER AND HEAT TRANSFER MEMBER

INCORPORATION BY REFERENCE

The disclosure of Japanese Patent Application No. 2017-197025 filed on Oct. 10, 2017 including the specification, drawings and abstract is incorporated herein by reference in its entirety.

BACKGROUND

1. Technical Field

The disclosure relates to a filler for a heat transfer member and a heat transfer member.

2. Description of Related Art

In the related art, an disclosure relating to an elastomer molded body having high thermal conduction properties and a method of manufacturing an elastomer is known (refer to Japanese Unexamined Patent Application Publication No. 2015-105282 (JP 2015-105282 A)). The disclosure described in JP 2015-105282 A provides an elastomer molded body having further improved thermal conduction properties by optimizing the orientation state of composite particles blended as a thermally conductive filler. The disclosure described in JP 2015-105282 A discloses the following elastomer molded body.

The elastomer molded body has a base material made of an elastomer and composite particles oriented and contained in the base material. The composite particles include thermally conductive anisotropic particles having anisotropy in thermal conduction and magnetic particles adhered to a surface of the thermally conductive anisotropic particles by a binder. The filling ratio of the composite particles is 30 vol % or more when the volume of the elastomer molded body is 100 vol %.

In the elastomer molded body, an orientation dispersion degree S of the composite particles is −0.47 to −0.5. The orientation dispersion degree S is defined by the expression: $S = \langle 3\cos^2\theta - 1\rangle/2$. In the expression, $\theta$ is an angle of the normal line in a direction perpendicular to the surface of the composite particle with respect to the thermal conduction direction of the elastomer molded body. $\langle\ \rangle$ represents a spatial average value.

SUMMARY

For example, in a case where the elastomer molded body in the related art is used as a heat transfer member interposed between an electronic component and a heat sink for suppressing the temperature rise of the electronic component, electrical insulation properties in addition to high thermal conduction properties are needed. For this, there is a need for the composite particles oriented and contained in the base material to have electrical insulation properties. In the related art, as a filler contained in the heat transfer member, for example, a filler made of a material having insulation properties, such as ceramics, has been used.

In the elastomer molded body of the related art described in JP 2015-105282 A, in a case where insulation properties are needed, conduction between the composite particles can be blocked by allowing insulating inorganic particles in addition to the magnetic particles to adhere to the surface of the thermally conductive anisotropic particles. More specifically, when the insulating inorganic particles are adhered to the surface of the thermally conductive anisotropic particles, even if the composite particles are oriented while being in contact with each other, it becomes difficult for the thermally conductive anisotropic particles or magnetic particles (conductive particle) to come in contact with each other between the adjacent composite particles. Therefore, the electric resistance between the composite particles increases. By causing the composite particles to come in contact with each other via the insulating inorganic particles, conduction between the composite particles can be blocked.

However, there is a possibility that adhesion of the insulating inorganic particles to the surface of the thermally conductive anisotropic particles having conductivity as in the elastomer molded body of the related art may cause insufficient insulation properties.

The disclosure provides a heat transfer member and a filler for a heat transfer member capable of achieving both high thermal conduction properties and high electrical insulation properties.

A first aspect of the disclosure relates to a filler for a heat transfer member. The filler includes a core material which is made of an inorganic material or a metal material having a thermal conductivity of 15 W/mK or more, and transfers heat; and an insulating film which includes a silicon oxide film and a diamond-like carbon film having electrical insulation properties, and covers the core material. The dielectric breakdown voltage of the filler is 500 V or more.

According to the first aspect of the disclosure, both high thermal conduction properties by the core material having a thermal conductivity of 15 W/mK or more and high electrical insulation properties by the insulating film having a dielectric breakdown voltage of 500 V or more can be achieved. Since the insulating film includes the silicon oxide film and the diamond-like carbon (hereinafter, referred to as "DLC") film having electrical insulation properties, higher electrical insulation properties can be exhibited compared to a case where the core material is covered with the silicon oxide film as a single layer or the DLC film as a single layer.

In the filler according to the first aspect of the disclosure, the innermost layer of the insulating film may be the silicon oxide film. As described above, the outer side of the silicon oxide film covering the core material is further covered with the DLC film, and for example, carbon (C) can be introduced between silicon (Si) and oxygen (O) bonds to compensate for electrical defects. Accordingly, higher electrical insulation properties can be exhibited compared to a case where the core material is covered with the silicon oxide film as a single layer or the DLC film as a single layer.

A second aspect of the disclosure relates to a heat transfer member including a resin matrix; and the filler dispersed in the resin matrix. The resin matrix has a sheet shape, the filler is oriented along the thickness direction of the resin matrix, the length of the filler along the orientation direction of the filler is equal to or than the thickness of the resin matrix, and the thermal conductivity of the heat transfer member is 3 W/mK or more.

According to the second aspect of the disclosure, since the fillers penetrate through the resin matrix having a sheet shape in the thickness direction, a plurality of heat transfer paths penetrating through the resin matrix in the thickness direction is formed by the fillers. Therefore, according to the second aspect of the disclosure, both a thermal conductivity as high as 3 W/mK or more and high electrical insulation properties can be achieved by the fillers.

A third aspect of the disclosure relates to a heat transfer member including a resin matrix; and the filler dispersed in the resin matrix. The resin matrix includes a spherical filler dispersed together with the filler, and has a sheet shape, the resin matrix has a plurality of heat transfer paths penetrating through the resin matrix in the thickness direction of the resin matrix by the filler and the spherical filler, and the thermal conductivity of the heat transfer member is 3 W/mK or more.

According to the third aspect of the disclosure, since the fillers are connected to each other in the thickness direction of the resin matrix having a sheet shape via the spherical fillers, the heat transfer paths penetrating through resin matrix in the thickness direction are formed. Therefore, according to the third aspect of the disclosure, both thermal conduction properties as high as 3 W/mK or more and high electrical insulation properties can be achieved by the fillers and the spherical fillers.

According to the aspects of the disclosure, it is possible to provide a heat transfer member and a filler for a heat transfer member capable of achieving both high thermal conduction properties and high electrical insulation properties.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of a filler for a heat transfer member and a heat transfer member according to the aspects of the disclosure will be described with reference to the drawings.

Filler for Heat Transfer Member

Figure 1:
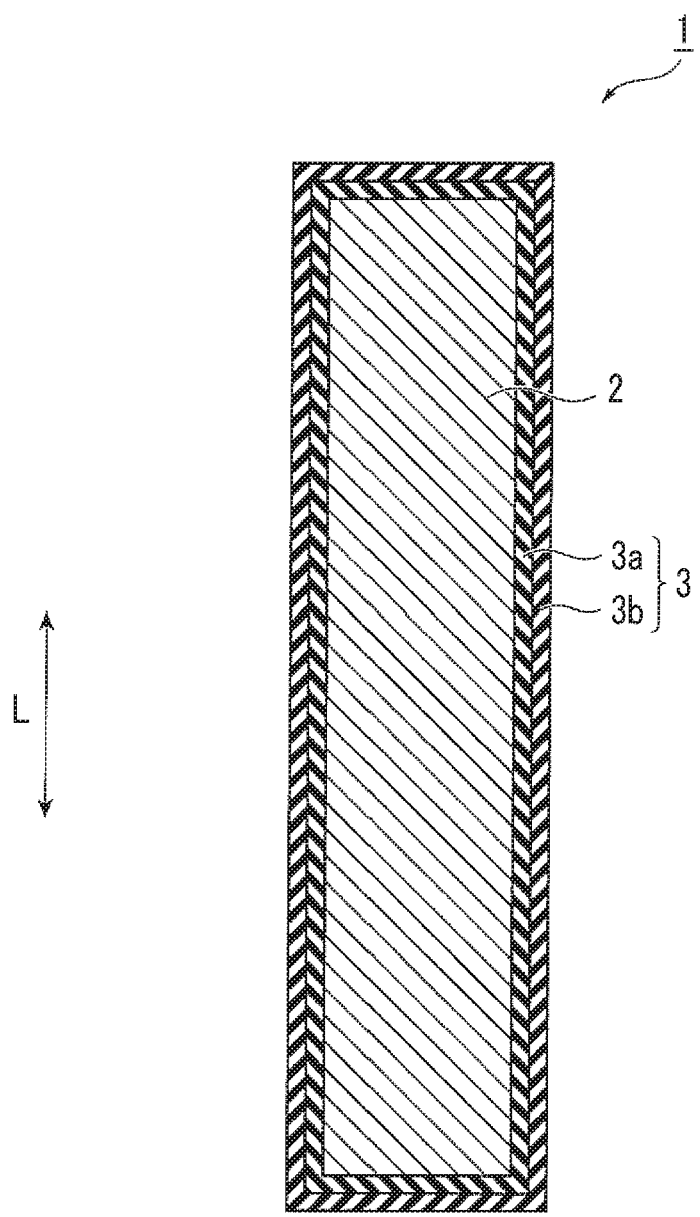
FIG. 1 is a schematic sectional view illustrating a filler according to an embodiment of the disclosure.

FIG. 1 is a schematic sectional view of a filler 1 according to the embodiment of the disclosure. The filler 1 of the embodiment can be used as a filler for a heat transfer member, which is interposed between an electronic component and a heat sink for suppressing the temperature rise of the electronic component. The filler 1 is not limited to the heat transfer member for an electronic component and can be used for a heat transfer member in various applications in which both high thermal conduction properties and high electrical insulation properties are needed.

The filler 1 includes a core material 2 that transfers heat and an insulating film 3 that covers the core material 2. The core material 2 is made of an inorganic material or metal material having a thermal conductivity of 15 W/mK or more. The insulating film 3 includes a silicon oxide film 3a and a diamond-like carbon film 3b having electrical insulation properties. The dielectric breakdown voltage of the filler 1 is 500 V or more. Although the size of the filler 1 is not particularly limited, for example, the diameter or the minimum width of a cross section perpendicular to a lengthwise direction L is 5 mm or less.

As the inorganic material forming the core material 2, for example, aluminum oxide, magnesium oxide, crystalline silica, hexagonal boron nitride, aluminum nitride, silicon nitride, silicon carbide, boron carbide, carbon (graphite), graphite, carbon nanotube (CNT), carbon fiber, boron nitride nanotube (BNNT), and the like can be used. On the other hand, as the metal material forming the core material 2, for example, copper, iron, silver, aluminum, and the like can be used.

From the viewpoint of further improving the thermal conductivity of the filler 1, the core material 2 has a thermal conductivity of preferably 50 W/mK or more, and more preferably 100 W/mK or more. The shape of the core material 2 is not particularly limited, for example, may adopt a shape such as a plate shape, a rod shape, a column shape, a needle shape, and a fibrous shape. More specifically, for example, the core material 2 made of a metal material in a rod shape or a fibrous shape can be manufactured by subjecting a metal plate to wire-cutting. As the core material 2 in a fibrous shape, for example, a wire having a diameter of 10 μm or more and a length of 50 μm or more can be used.

The insulating film 3 may include a single silicon oxide film 3a and a single DLC film 3b having electrical insulation properties, or may include a plurality of silicon oxide films 3a and a plurality of DLC films 3b having electrical insulation properties. In a case where the insulating film 3 includes the silicon oxide films 3a and the DLC films 3b, the silicon oxide films 3a and the DLC film 3b can be alternately laminated. From the viewpoint of further improving electrical insulation properties, the innermost layer of the insulating film 3 is preferably the silicon oxide film 3a. That is, in a case where the insulating film 3 includes a plurality of films, it is preferable to form the lower layer from a film having a large atomic number.

The insulating film 3 can be formed by forming a material on the surface of the core material 2 by, for example, plasma chemical vapor deposition (CVD). More specifically, for example, the silicon oxide film 3a is formed on the surface of the core material 2 by the plasma CVD, and the DLC film 3b is further formed on the surface of the silicon oxide film 3a by the plasma CVD performed on the silicon oxide film 3a. As described above, the insulating film 3 having the silicon oxide film 3a covering the surface of the core material 2 and the DLC film 3b covering the silicon oxide film 3a can be formed. The silicon oxide film 3a is made of at least one of silicon monoxide (SiO) and silicon dioxide (SiO$_2$).

The thickness of the insulating film 3 is not particularly limited as long as the dielectric breakdown voltage of the filler 1 can be 500 V or more. In the embodiment, the thickness of the insulating film 3 is about 5 µm, the thickness of the silicon oxide film 3a (SiO film) is about 3 µm, and the thickness of the DLC film 3b laminated on the SiO film is about 2 µm. A method of forming the insulating film 3 is not limited to the plasma CVD, and a wet method such as plating, sputtering, a dry method, and the like can be adopted. The operation and effect of the filler 1 of the embodiment having the configuration described above will be described together with the configuration, operation and effect of the heat transfer member described below.

Heat Transfer Member: First Embodiment

Figure 2:
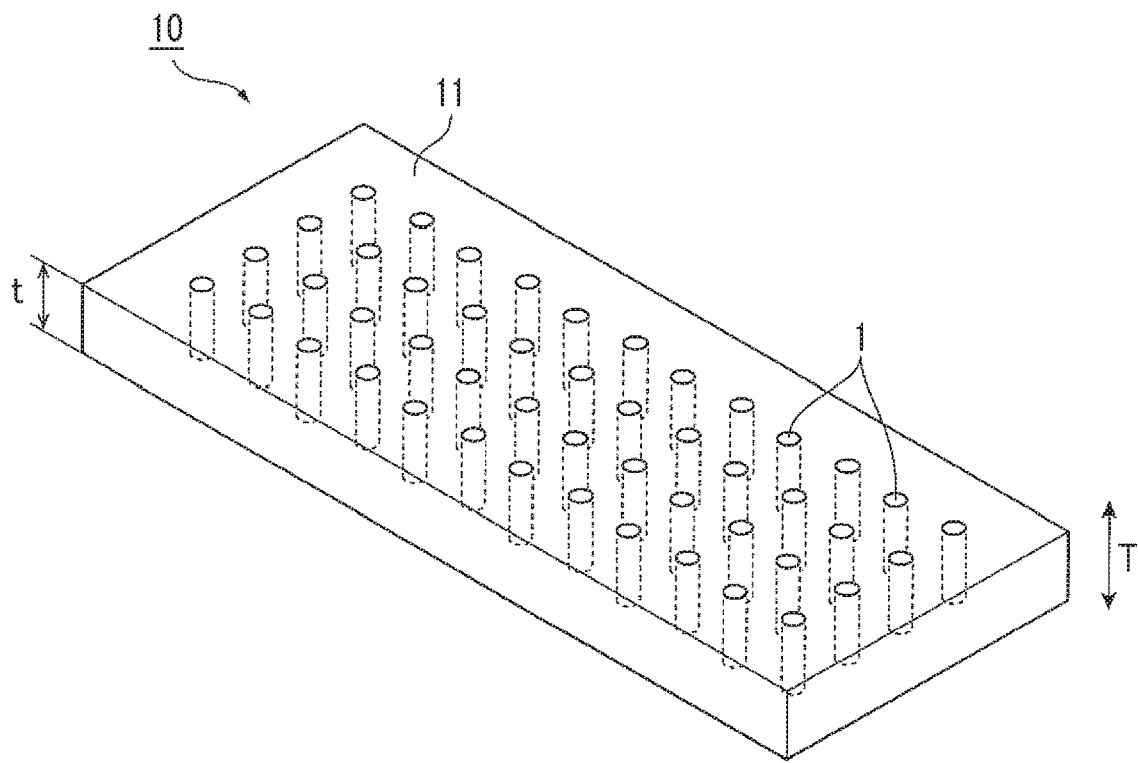
FIG. 2 is a schematic perspective view illustrating an example of a heat transfer member according to First embodiment of the disclosure.
Figure 3:
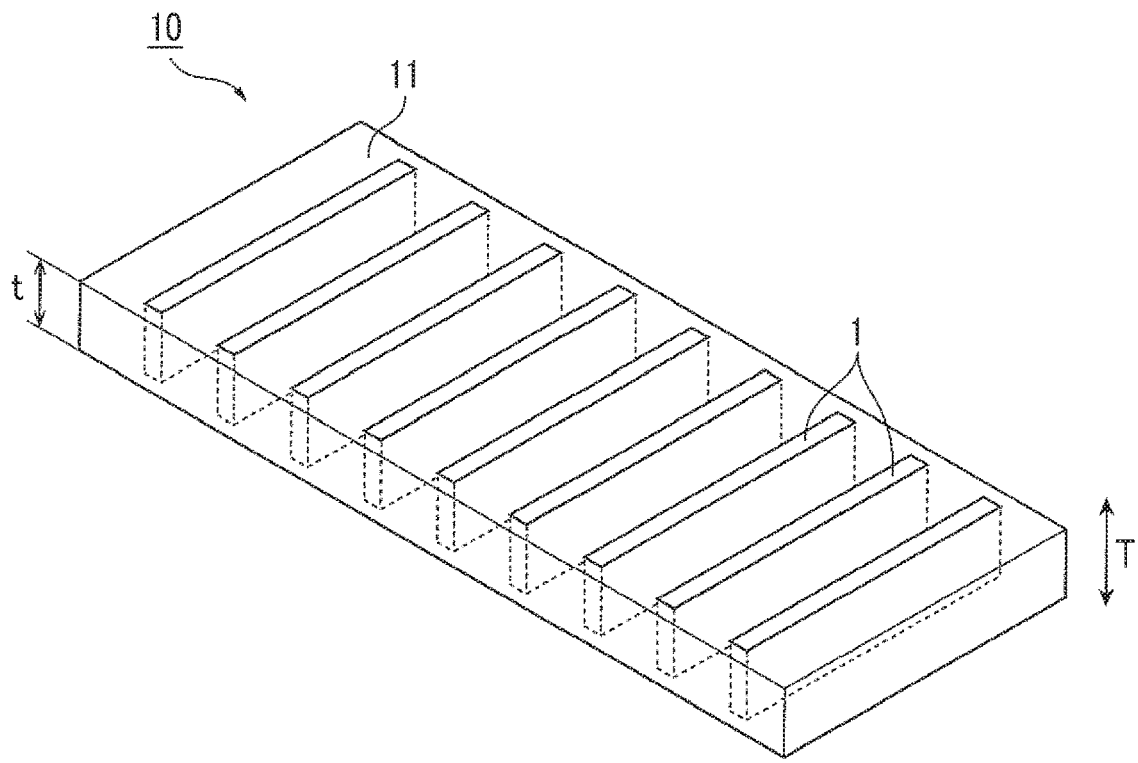
FIG. 3 is a schematic perspective view illustrating another example of the heat transfer member according to First Embodiment of the disclosure.

FIG. 2 is a schematic perspective view illustrating an example of the heat transfer member according to First Embodiment of the disclosure. FIG. 3 is a schematic perspective view illustrating another example of the heat transfer member according to First Embodiment of the disclosure. A heat transfer member 10 is, for example, a member interposed between an electronic component and a heat sink, and needs to have high thermal conduction properties and high electrical insulation properties.

The heat transfer member 10 is manufactured, for example, by dispersing the fillers 1 in a resin matrix 11. The resin matrix 11 has a sheet shape. The filler 1 is oriented along a thickness direction T of the resin matrix 11, and the length of the connected and oriented fillers 1 along the orientation direction is equal to or more than the thickness t of the resin matrix 11. The heat transfer member 10 has a thermal conductivity of 3 W/mK or more.

The resin matrix 11 is made of, for example, a thermosetting resin or thermoplastic resin having an Asker C hardness of 5 or more. As the thermosetting resin, for example, a silicone resin, or a urethane resin can be used. Although it is possible to use a thermoplastic resin as the resin matrix 11, from the viewpoint of reducing the stress applied to the filler 1 during molding, it is preferable to use a thermosetting resin. The thickness of the resin matrix 11 having a sheet shape is not particularly limited, but is, for example, about 1 mm to about 2 mm, or about several millimeters to several tens of millimeters.

In the example illustrated in FIG. 2, the filler 1 has a columnar shape, a rod shape, a needle shape, or a fibrous shape, and the axial direction, lengthwise direction, longitudinal direction, or extension direction of the filler 1 is oriented in the thickness direction T of the resin matrix 11. That is, in the example illustrated in FIG. 2, the orientation direction of the filler 1 is the axial direction, the lengthwise direction, the longitudinal direction, or the extending direction of the filler 1, and the orientation direction of the filler 1 is along the thickness direction T of the resin matrix 11.

In the example illustrated in FIG. 3, the filler 1 has a rectangular plate shape, and the longitudinal direction or the long side direction and the thickness direction of the filler 1 intersect, for example, perpendicularly to the thickness direction T of the resin matrix 11, and the lateral direction or the short side direction of the filler 1 is oriented along the thickness direction T of the resin matrix 11. That is, in the example shown in FIG. 3, the orientation direction of the filler 1 is the lateral direction or the short side direction of the filler 1, and the orientation direction of the filler 1 is along the thickness direction T of the resin matrix 11.

Here, the orientation direction of the filler 1 being along the thickness direction T of the resin matrix 11 means that the angle between the orientation direction of the filler 1 and the thickness direction T of the resin matrix 11 is, for example, in a range of ±45°. The angle between the orientation direction of the filler 1 and the thickness direction T of the resin matrix 11 is preferably as small as possible. The filler 1 can be oriented in the thickness direction T of the resin matrix 11 by, for example, implanting the filler 1 in a mold for molding the resin matrix 11, or by generating an electric field or a magnetic field.

In a plan view of the heat transfer member 10 as viewed in the thickness direction T, the occupancy ratio of the fillers 1 per unit area is preferably, for example, 50% or less. In the thickness direction T of the resin matrix 11, the end portion of the filler 1 may protrude from the surface of the resin matrix 11 or may be disposed on the surface of the resin matrix 11. The heat transfer member 10 may be manufactured by orienting the fillers 1 and thereafter filling and curing the resin matrix 11, or may be manufactured by filling the resin matrix 11, then orienting the fillers 1, and thereafter curing the resin matrix 11.

Hereinafter, the operation of the heat transfer member 10 and the filler 1 for a heat transfer member of the embodiment will be described.

Figure 4:
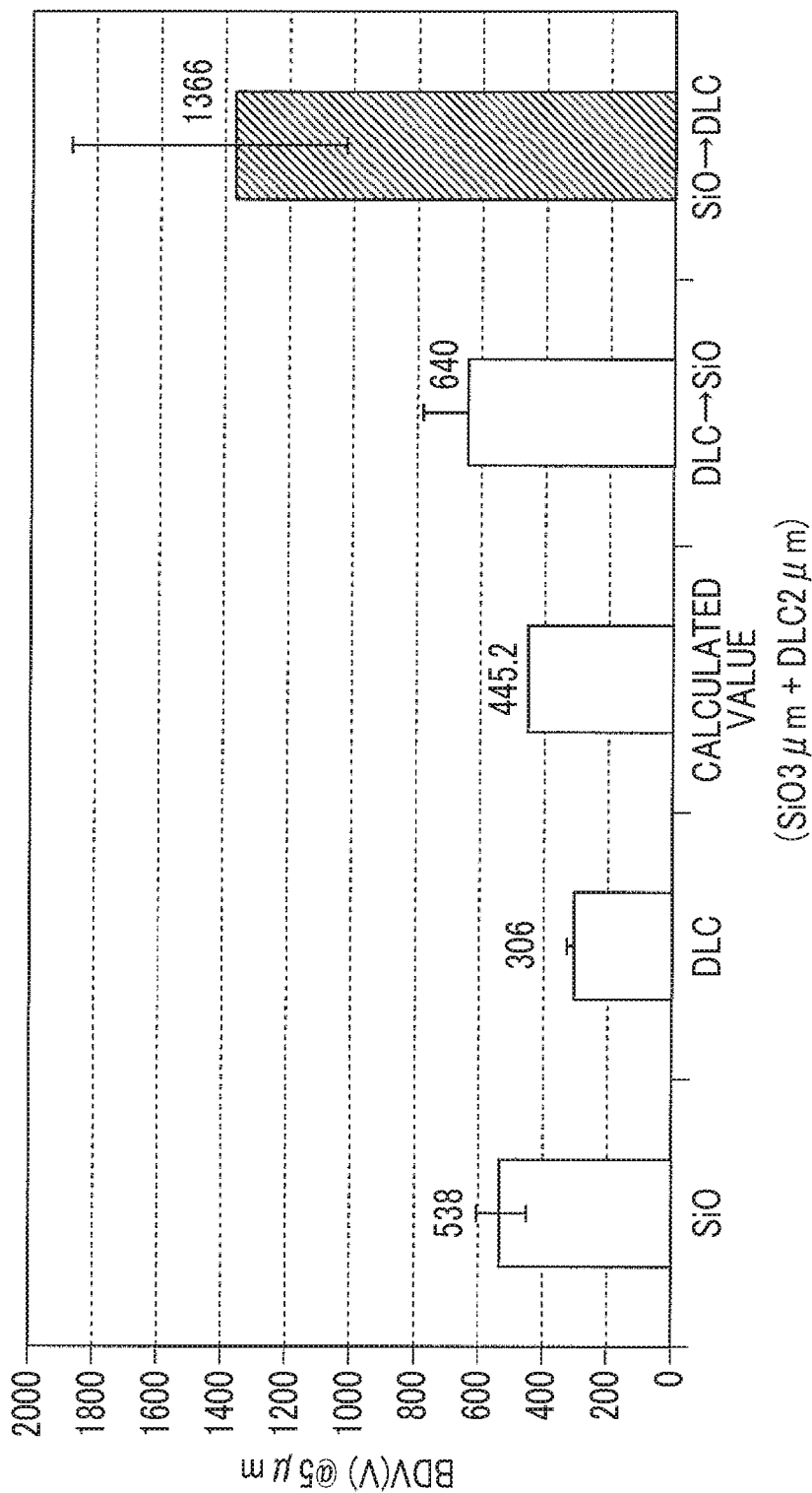
FIG. 4 is a graph showing an example of a dielectric breakdown voltages of the heat transfer member according to First Embodiment and other heat transfer members.

FIG. 4 is a graph showing the dielectric breakdown voltage of the heat transfer member 10 of the embodiment and the dielectric breakdown voltages of the other heat transfer members. The vertical axis of the graph of FIG. 4 is the dielectric breakdown voltage (BDV) of each of the heat transfer members using a filler having an insulating film thickness of 5 µm. The dielectric breakdown voltage was measured by disposing electrodes so as not to generate a creeping discharge between the front and the rear of the heat transfer member in the thickness direction T and applying a voltage in the thickness direction T of the heat transfer member.

The bar at the left end shows that the dielectric breakdown voltage of the heat transfer member using a filler, in which a SiO film as a single layer having a thickness of 5 µm is used as the insulating film, is 538 V. The second bar from the left shows that the dielectric breakdown voltage of the heat transfer member using a filler, in which a DLC film as a single layer having electrical insulation properties is used as the insulating film, is 306 V.

The center bar shows a calculated value of the dielectric breakdown voltage of the heat transfer member 10 of the embodiment, which is predicted from the results described above. The heat transfer member 10 of the embodiment uses the filler 1 having the insulating film 3 constituted by the SiO film which is the silicon oxide film 3a having a thickness of about 3 µm and the DLC film 3b which is laminated on the SiO film to have a thickness of about 2 µm and has electrical insulation properties.

As shown by the bar at the left end, the dielectric breakdown voltage of the heat transfer member including the filler having the insulating film formed of the SiO film as the single layer having a thickness of 5 µm is 538 V. Therefore, the calculated value of the dielectric breakdown voltage of a heat transfer member including a filler in which a SiO film as a single layer having a thickness of 3 µm is used as an insulating film is (538 V/5 µm)×3 µm=322.8 [V].

From the second bar from the left, the dielectric breakdown voltage of the heat transfer member including the filler having the insulating film formed of the DLC film which is a single layer having a thickness of 5 μm and has electrical insulation properties is 306 V. Therefore, the calculated value of the dielectric breakdown voltage of a heat transfer member including a filler in which a DLC film as a single layer having a thickness of 2 μm is used as an insulating film is (306 V/5 μm)×2 μm=122.4 V]

Therefore, the calculated value of the dielectric breakdown voltage of the heat transfer member 10 including the filler 1 having the insulating film 3 constituted by the SiO film which is the silicon oxide film 3a having a thickness of about 3 μm and the DLC film 3b which is laminated on the SiO film to have a thickness of about 2 μm and has electrical insulation properties is 322.8 V+122.4 V=445.2 V.

The reason that the dielectric breakdown voltage of the heat transfer member including the filler having the insulating film formed of the SiO film is higher than the dielectric breakdown voltage of the heat transfer member including the filler having the insulating film formed of the DLC film is that the electrical insulation properties of glassy SiO are higher than the electrical insulation properties of DLC.

Contrary to the above description, as shown by the second bar from the right, the dielectric breakdown voltage of the heat transfer member 10 according to the embodiment of the disclosure is 640 V, which is higher than 1.4 times the calculated value. The heat transfer member 10 according to the embodiment of the disclosure includes the filler 1 having the insulating film 3 constituted by the DLC film 3b having a thickness of about 2 μm and electrical insulation properties and the SiO film which is the silicon oxide film 3a laminated on the DLC film 3b to have a thickness of about 3 μm.

As shown by the bar at the right end, the dielectric breakdown voltage of the heat transfer member 10 according to another embodiment of the disclosure is 1366 V, which is higher than three times the calculated value. The heat transfer member 10 according to another embodiment of the disclosure includes the filler 1 having the insulating film 3 constituted by the SiO film which is the silicon oxide film 3a having a thickness of about 3 μm and the DLC film 3b which is laminated on the SiO film to have a thickness of about 2 μm and has electrical insulation properties.

That is, as described above, the filler 1 according to the embodiment of the disclosure includes the core material 2 which transfers heat and the insulating film 3 which covers the core material 2. The insulating film 3 has the silicon oxide film 3a and the DLC film 3b having electrical insulation properties. As described above, the heat transfer member 10 including the filler 1 of the embodiment shown by the bar at the right end or the second bar from the right has higher dielectric breakdown voltages, that is, higher electrical insulation properties compared to the heat transfer member including the filler having the insulating film formed of the SiO film as the single layer or the DLC film as the single layer shown by the bar at the left end or the second bar from the left.

As described above, the center bar shows the calculated value of the dielectric breakdown voltage of the heat transfer member 10 including the filler 1 having the insulating film 3 constituted by the SiO film which is the silicon oxide film 3a having a thickness of about 3 μm and the DLC film 3b which has a thickness of about 2 μm and electrical insulation properties. The calculated value is calculated from the dielectric breakdown voltage of the heat transfer member including the filler having the insulating film formed of the SiO film as a single layer having a thickness of about 5 μm and the dielectric breakdown voltage of the heat transfer member including the filler having the insulating film formed of the DLC film as the single layer having a thickness of about 5 μm.

Compared to the calculated value shown by the center bar, as shown by the bar at the right end and the second bar from the right, the heat transfer member 10 including the filler 1 of the embodiment has a higher dielectric breakdown voltage, that is, higher electrical insulation properties. The heat transfer member 10 of the embodiment includes the filler 1 having the insulating film 3 constituted by the SiO film which is the silicon oxide film 3a having a thickness of about 3 μm and the DLC film 3b which has a thickness of about 2 μm and electrical insulation properties.

The heat transfer member 10 shown by the bar at the right end includes the filler 1 having the SiO film, that is, the silicon oxide film 3a as the innermost layer of the insulating film 3 and the DLC film 3b on the outer side of the SiO film. On the other hand, the heat transfer member 10 shown by the second bar from the right includes the filler 1 having the DLC film 3b as the innermost layer of the insulating film 3 and the SiO film, that is, the silicon oxide film 3a on the outer side of the DLC film. The heat transfer member 10 shown by the bar at the right end shows a dielectric breakdown voltage, that is, electrical insulation properties as high as twice that of the heat transfer member 10 shown by the second bar from the right.

Figure 5:
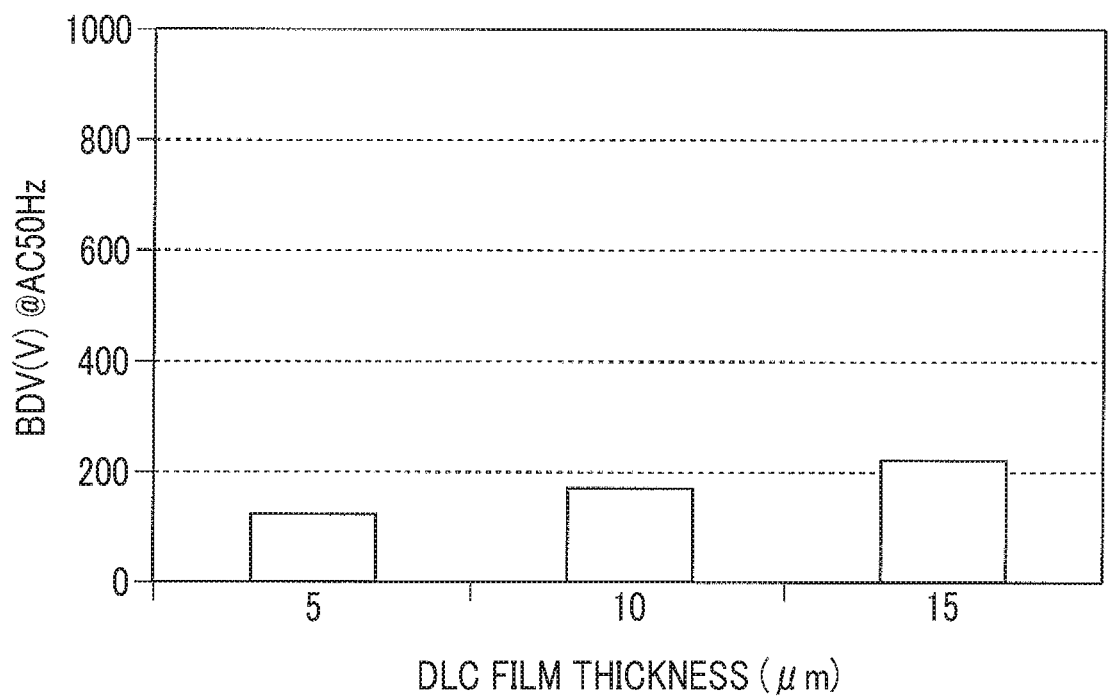
FIG. 5 is a graph showing the relationship between a DLC film thickness and a dielectric breakdown voltage in a case where an insulating film of the filler included in the heat transfer member is a DLC film as a single layer.

FIG. 5 is a graph showing the relationship between the DLC film thickness and the dielectric breakdown voltage of a heat transfer member in which an insulating film of a filler is a DLC film as a single layer. The bar graph of FIG. 5 shows the dielectric breakdown voltages of the heat transfer members at an alternating current voltage of 50 Hz in a case where the DLC film thickness is 5 μm, 10 μm, and 15 μm from the left. As shown in FIG. 5, in the case where the insulating film of the filler is the DLC film as the single layer, even if the DLC film thickness is increased by a factor of two or three times, the dielectric breakdown voltage of the heat transfer member is not increased by a factor or two or three times.

Contrary to the above description, in the heat transfer member 10 including the filler 1 according to the embodiment, the dielectric breakdown voltage is increased by a factor of two or three times or more compared to a case where the insulating film of the filler is the DLC film as the single layer as shown in FIG. 4.

Figure 6:
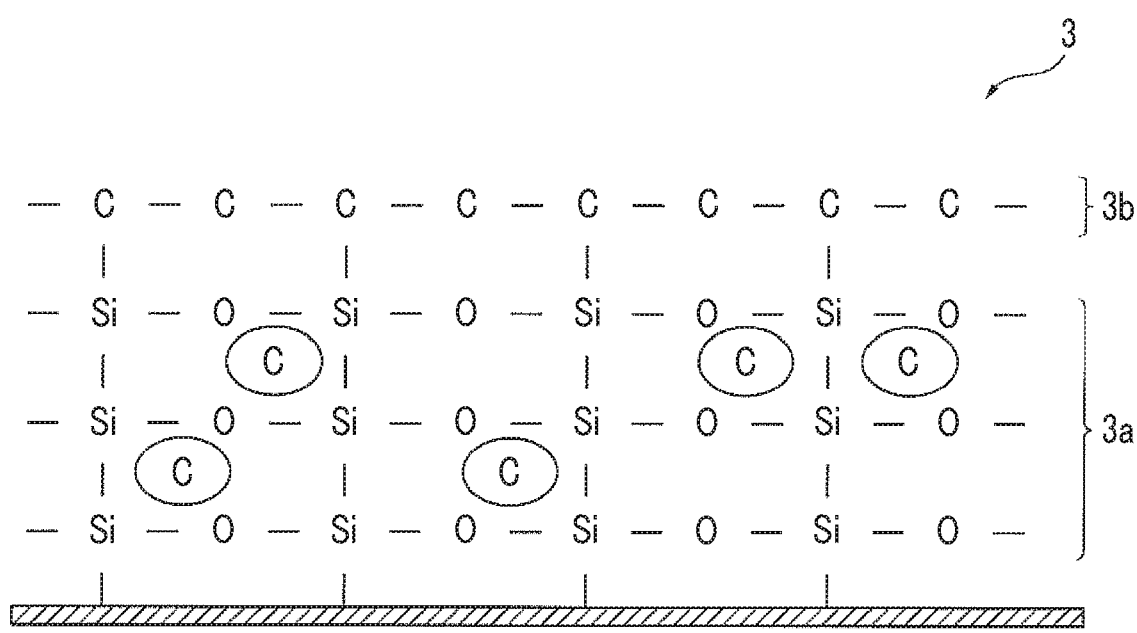
FIG. 6 is a schematic view illustrating an example of the insulating film of the filler according to the embodiment of the disclosure.

FIG. 6 is a schematic view of the insulating film 3 of the filler 1 according to the embodiment. In the example illustrated in FIG. 6, the insulating film 3 has the SiO film which is the silicon oxide film 3a as the innermost layer, and the DLC film 3b is laminated on the SiO film. In the SiO film, Si—O bonds are long and defects are likely to occur. However, it is thought that C atoms are introduced between the Si—O bonds by laminating the DLC film 3b on the SiO film and thus act to block electrical defects. Therefore, in the insulating film 3 including the silicon oxide film 3a and the DLC film 3b having electrical insulation properties, the innermost layer is the silicon oxide film 3a, thereby exhibiting high electrical insulation properties.

As described above, with the filler 1 of the embodiment, both high thermal conduction properties by the core material 2 having a thermal conductivity of 15 W/mK or more and high electrical insulation properties by the insulating film 3 having a dielectric breakdown voltage of 500 V or more can be achieved. Since the insulating film 3 includes the silicon oxide film 3a and the DLC film 3b having electrical insulation properties, higher electrical insulation properties can be exhibited compared to a case where the core material 2 is covered with the silicon oxide film as a single layer or the DLC film as a single layer.

In a case where the innermost layer of the insulating film 3 is the silicon oxide film 3a, the outer side of the silicon oxide film 3a covering the core material 2 is further covered with the DLC film 3b, and for example, carbon (C) can be introduced between silicon (Si) and oxygen (O) bonds to compensate for electrical defects. Accordingly, higher electrical insulation properties can be exhibited compared to a case where the core material 2 is covered with the silicon oxide film as a single layer or the DLC film as a single layer.

With the heat transfer member 10 of the embodiment including the filler 1, since the fillers 1 penetrate through the resin matrix 11 having a sheet shape in the thickness direction T, the heat transfer paths penetrating through the resin matrix 11 in the thickness direction T are formed by the fillers 1. Therefore, with the heat transfer member 10 of the embodiment, both thermal conduction properties as high as 3 W/mK or more and high electrical insulation properties can be achieved by the fillers 1.

Heat Transfer Member: Second Embodiment

Figure 7:
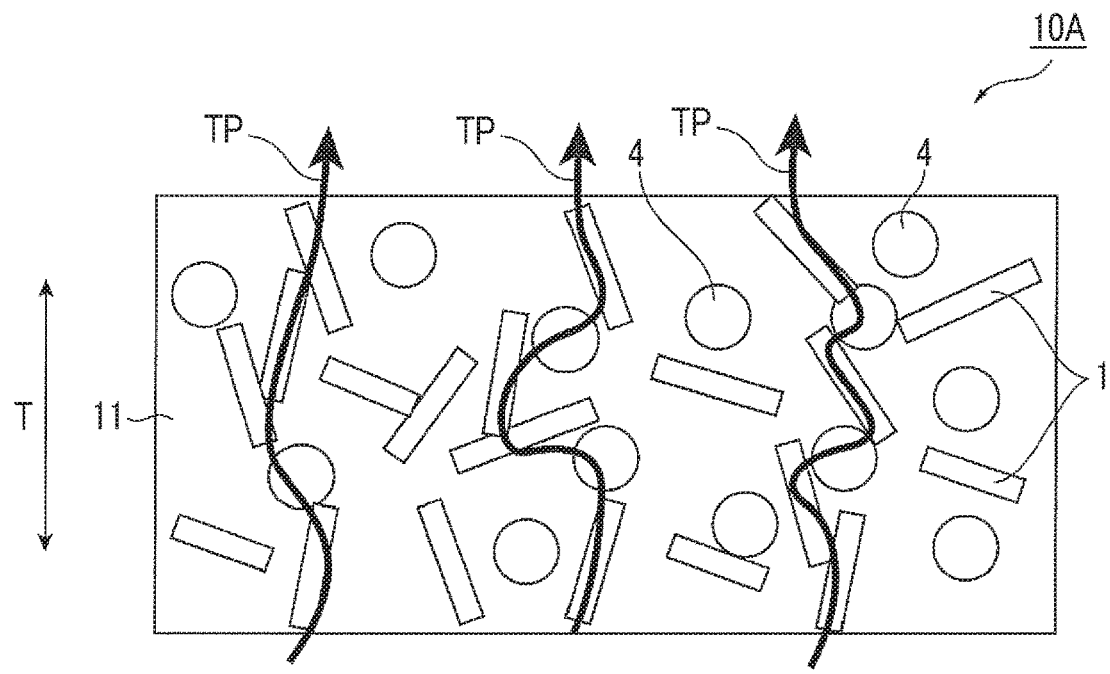
FIG. 7 is a schematic sectional view of a heat transfer member according to the Second Embodiment of the disclosure.

Referring to FIG. 1, a heat transfer member 10A according to another embodiment of the disclosure will be described with reference to FIGS. 7 to 9. FIG. 7 is a schematic sectional view of the heat transfer member 10A according to the embodiment.

The heat transfer member 10A of the embodiment is obtained by dispersing the fillers 1 according to the embodiment described above in the resin matrix 11. In the heat transfer member 10A, the resin matrix 11 has a sheet shape including spherical fillers 4 dispersed together with the fillers 1 according to the embodiment described above. The heat transfer paths TP penetrating through the resin matrix 11 in the thickness direction T are formed by the fillers 1 and the spherical fillers 4. The heat transfer member 10A of the embodiment has a thermal conductivity of 3 W/mK or more as in the heat transfer member 10 according to First Embodiment described above.

As the resin forming the resin matrix 11, the same resin as the heat transfer member 10 according to First Embodiment described above can be used. As the spherical filler 4, for example, aluminum oxide (alumina), silicon dioxide (silica), calcium carbonate, calcium fluoride, mica, talc, and the like can be used. The filling amount of the fillers 1 can be made smaller than the filling amount of the spherical fillers 4.

Hereinafter, the operation of the heat transfer member 10A of the embodiment will be described based on comparison to heat transfer members 10X, 10Y of comparative embodiments.

Figure 8:
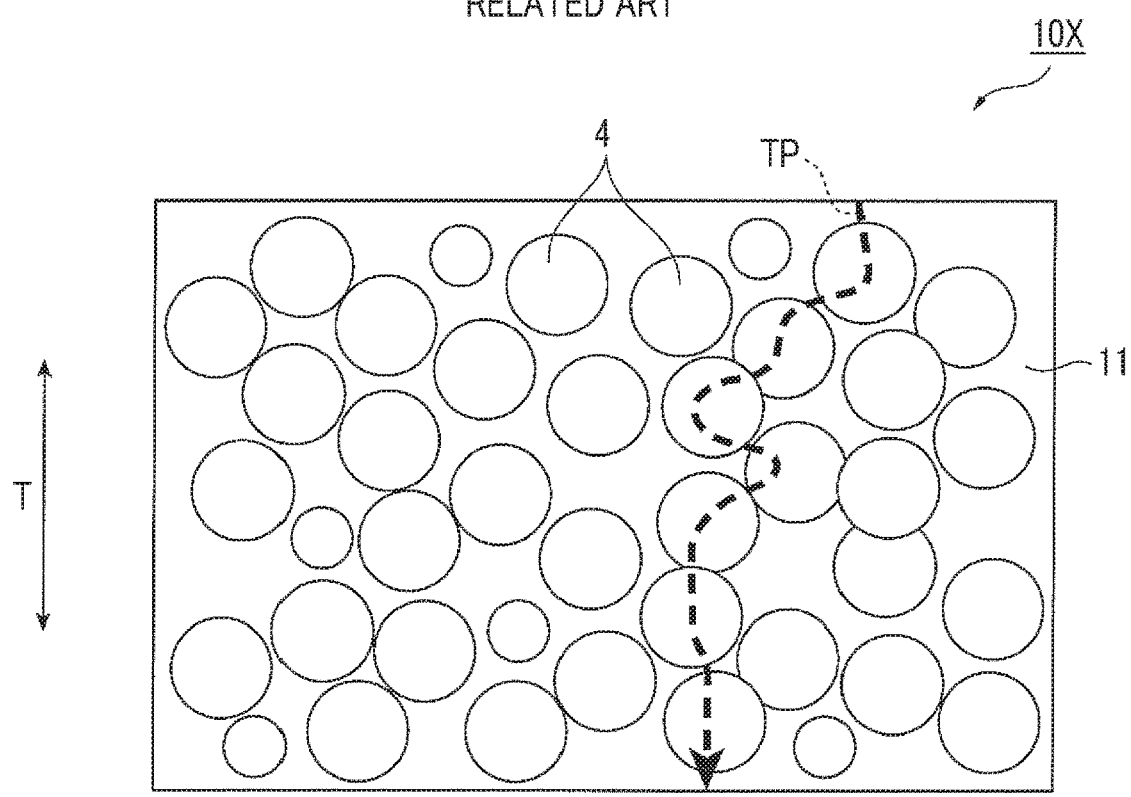
FIG. 8 is a schematic sectional view of a heat transfer member of First Comparative Embodiment.

FIG. 8 is a schematic sectional view of the heat transfer member 10X of First Comparative Embodiment including solely the spherical fillers 4. In order to form the heat transfer paths TP penetrating through the resin matrix 11 in the thickness direction T, in the heat transfer member 10X of First Comparative Embodiment including solely the spherical fillers 4, the spherical fillers 4 arranged in the thickness direction T of the resin matrix 11 need to be brought into contact with each other. Therefore, in order to form the heat transfer paths TP penetrating through the resin matrix 11 in the thickness direction T, a high filling state in which the filling ratio of the spherical fillers 4 is high needs to be achieved.

Figure 9:
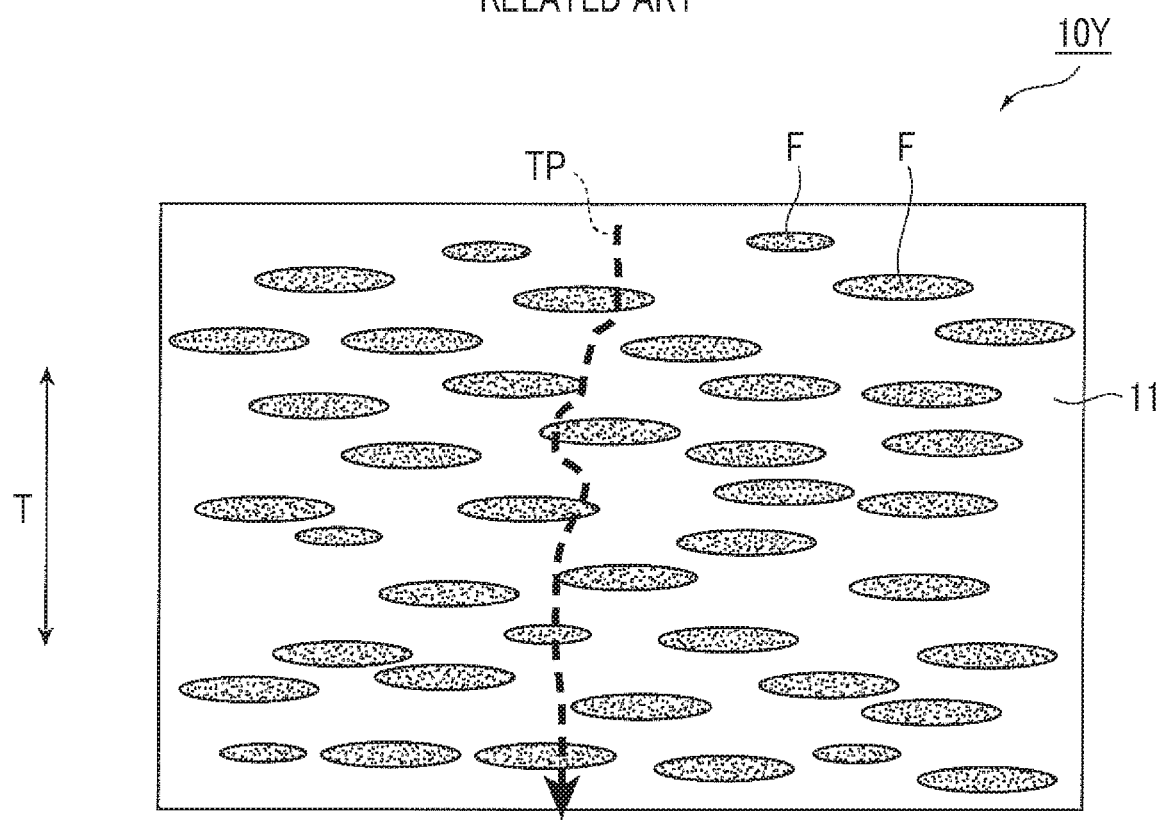
FIG. 9 is a schematic sectional view of a heat transfer member of Second Comparative Embodiment.

FIG. 9 is a schematic sectional view of the heat transfer member 10Y of Second Comparative Embodiment including solely plate-shaped or needle-shaped fillers F. In the heat transfer member 10 Y of Second Comparative Embodiment including solely the plate-shaped or needle-shaped filler F, the fillers F are oriented in a resin flowing direction substantially perpendicular to the thickness direction T of the resin matrix 11, by the resin material in a flowing state during molding of the resin matrix 11. Therefore, the plate-shaped or needle-shaped fillers F arranged in the thickness direction T of the resin matrix 11 are less likely to come into contact with each other, so that it becomes difficult to secure the heat transfer paths TP penetrating through the resin matrix 11 in the thickness direction T.

Contrary to the above description, with the heat transfer member 10A of the embodiment illustrated in FIG. 7, since the fillers 1 are connected in the thickness direction T of the resin matrix 11 having a sheet shape via the spherical fillers 4, the heat transfer paths TP penetrating through resin matrix 11 in the thickness direction T are formed. Therefore, with the heat transfer member 10A of the embodiment, even in a case where the filling ratio of the fillers 1 and the spherical fillers 4 is reduced to be lower than those of the heat transfer members 10X, 10Y of Comparative Embodiments 1 and 2, both thermal conduction properties as high as 3 W/mK or more and high electrical insulation properties can be achieved by the fillers 1 and the spherical fillers 4.

As described above, according to the embodiments described above, it is possible to provide the heat transfer members 10, 10A and the filler 1 for a heat transfer member capable of achieving both high thermal conduction properties and high electrical insulation properties.

While the embodiments have been described in detail with reference to the drawings, specific configurations are not limited to the embodiments, and even if there are design changes and the like within the scope that does not deviate from the gist of the disclosure, such design changes and the like are included in the disclosure.

Examples

Heat transfer members of Examples 1 to 4 were manufactured in the following order. Fillers were disposed and oriented in the cavity of a mold for molding a discoid resin matrix having a diameter of φ50 mm and a thickness of 7 mm. The fillers were oriented along one direction to be directed in the thickness direction of the resin matrix after the molding. A liquid silicone resin (model name KE-1871) manufactured by Shin-Etsu Chemical Co., Ltd. was poured into the cavity of the mold, and was subjected to a curing treatment in a hot air furnace at 120° C. for one hour. After curing the silicone resin, the silicone resin was cooled to room temperature, and releasing was performed to remove a heat transfer member manufactured as a result from the mold, thereby obtaining the heat transfer members of Examples 1 to 4.

Heat transfer members of Comparative Examples 1 to 5 were manufactured in the following order. Fillers were added and mixed in the silicone resin, and the silicone resin having the fillers dispersed therein was poured into the mold and was subjected to a curing treatment in the hot air furnace at 120° C. for one hour. After curing the silicone resin, the silicone resin was cooled to room temperature, and releasing was performed to remove a heat transfer member manufactured as a result from the mold, thereby obtaining the heat transfer members of Comparative Examples 1 to 5.

Table 1 below shows the core material, density, shape, and presence or absence of orientation of the fillers included in the heat transfer member of each of the examples and the comparative example, and the resin and density of the resin matrix included in the heat transfer member described above. Table 2 below shows the weight ratio and volume ratio of the fillers and the resin matrix included in the heat transfer member of each of the examples and the comparative examples, and the thermal conductivity of the heat transfer member.

TABLE 1

|  | Filler | | | Resin matrix | |
| --- | --- | --- | --- | --- | --- |
|  | Core material | Density [g/cm³] | Shape | Orientation | Resin | Density [g/cm³] |
| Example 1 | Cu | 8.96 | Plate shape | Present | silicone | 1.0 |
| Example 2 | | | | | | |
| Example 3 | h-BN | 1.90 | | | | |
| Example 4 | | | | | | |
| Comparative Example 1 | h-BN | 1.90 | Scaly shape | Absent | silicone | 1.0 |
| Comparative Example 2 | | | | | | |
| Comparative Example 3 | | | | | | |
| Comparative Example 4 | | | | | | |
| Comparative Example 5 | | | | | | |

TABLE 2

|  | Weight ratio [wt %] | | Volume ratio [vol %] | | Thermal conductivity [W/mK] |
| --- | --- | --- | --- | --- | --- |
|  | Filler | Resin | Filler | Resin | |
| Example 1 | 15 | 85 | 1.5 | 98.5 | 3.4 |
| Example 2 | 27 | 73 | 3.1 | 96.9 | 7.0 |
| Example 3 | 30 | 70 | 14.8 | 85.2 | 4.8 |
| Example 4 | 60 | 40 | 37.8 | 62.2 | 10.7 |
| Comparative Example 1 | 30 | 70 | 14.8 | 85.2 | 1.1 |
| Comparative Example 2 | 40 | 60 | 21.3 | 78.7 | 1.5 |
| Comparative Example 3 | 50 | 50 | 28.8 | 71.2 | 1.7 |
| Comparative Example 4 | 60 | 40 | 37.8 | 62.2 | 2.5 |
| Comparative Example 5 | 70 | 30 | 48.6 | 51.4 | 3.7 |

As shown in Table 1, in the fillers included in the heat transfer members of Examples 1 and 2, the core material is a rectangular copper plate or copper foil of 5 mm×5 mm×0.3 mm, and is oriented in the thickness direction of the resin matrix (orientation: present). In the fillers included in the heat transfer members of Examples 3 and 4, the core material is a rectangular hexagonal boron nitride plate of 5 mm×5 mm×3 mm, and is oriented in the thickness direction of the resin matrix (orientation: present). On the other hand, the fillers included in the heat transfer members of Comparative Examples 1 to 5 are made of scaly-shaped hexagonal boron nitride manufactured by Momentive Performance Materials Japan LLC, which has a maximum diameter of about 45 μm, are dispersed in the resin matrix, and thus are not oriented in one direction (orientation: absent).

As shown in Table 2, in the heat transfer members of Examples 1 to 4, the weight ratio and the volume ratio of the fillers to the resin forming the resin matrix increase in the order of Example 1, Example 2, Example 3, and Example 4. Similarly, in the heat transfer members of Comparative Examples 1 to 5, the weight ratio and the volume ratio of the fillers to the resin forming the resin matrix increase in the order of Comparative Example 1, Comparative Example 2, Comparative Example 3, Comparative Example 4, and Comparative Example 5. The weight ratio and the volume ratio between the fillers and the resin of the heat transfer members of Examples 3 and 4 are the same as the weight ratio and the volume ratio between the fillers and the resin of the heat transfer members of Comparative Example 1 and Comparative Example 4, respectively.

The thermal conductivities of the heat transfer members of Examples 1 to 4 and Comparative Examples 1 to 5 were measured. The measurement result of the thermal conductivity of each of the heat transfer members is shown in Table 2. The thermal conductivity of the heat transfer member was measured by the following measurement method.

Figure 10:
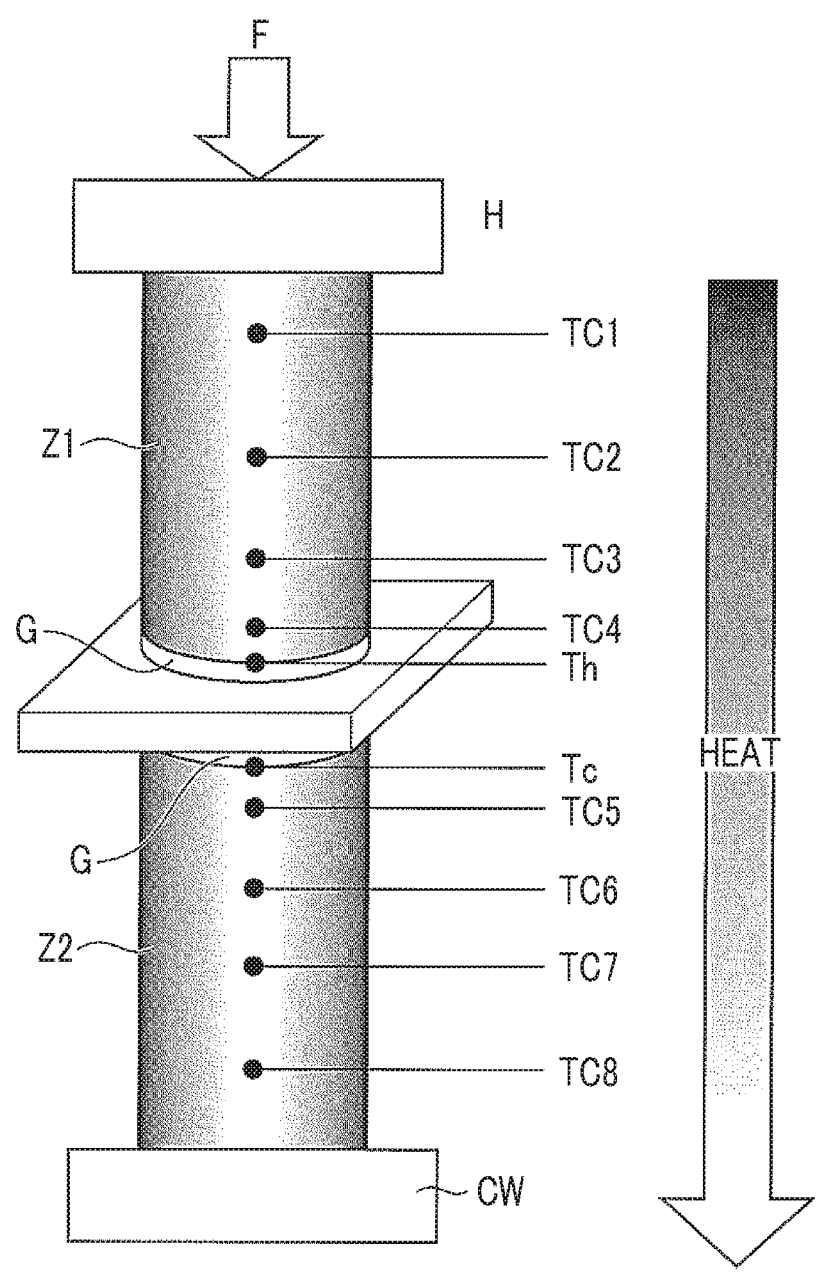
FIG. 10 is a schematic view showing a method of measuring the thermal conductivity of the heat transfer member.

FIG. 10 is a schematic view showing a method of measuring the thermal conductivity of the heat transfer member. A heat transfer member was nipped between a pair of copper jigs Z1, Z2 via a heat dissipation grease G for measurement, and a force F of 100 [N] was applied to press the heat transfer member. In the state described above, an end portion of the first jig Z1 which is on the opposite side of the jig Z1 from the heat transfer member was heated by a heater H, and an end portion of the second jig Z2 which is on the opposite side of the jig Z2 from the heat transfer member was cooled by cooling water CW. The control temperature of the heater H was about 60° C., the temperature of the cooling water CW was about 15° C., and the temperature of the heat transfer member during measurement was about 35° C. to about 40° C.

The temperature of the jig Z1 was measured at a plurality of measurement points TC1 to TC4 in a direction from the end portion of the first jig Z1 heated by the heater H to the heat transfer member. The temperature of the jig Z2 was measured at a plurality of measurement points TC5 to TC8 in a direction from the heat transfer member to the end portion of the second jig Z2 cooled by the cooling water CW.

The heat flux at the time of measurement was calculated from the measured temperatures of the jigs Z1, Z2 by Equation (1).

$$q = -\lambda_{cu} \frac{dTc}{dx} \quad (1)$$

In Equation (1), q is the heat flux [W/m²], $\lambda_{cu}$ is the thermal conductivity of copper (=400 W/mK), dTc/dx is the temperature gradient [K/m] of the measurement point of the jig, and x is the distance from the heat transfer member to the measurement point TC.

By Equation (2), the upper and lower surface temperatures Th, Tc of the heat transfer member were calculated.

$$Th(Tc) = y\_\text{intercept}(x_{TC}, TC) \quad (2)$$

The thermal resistance R [K/W] of the heat transfer member was calculated by Equation (3).

$$R = \frac{(Th - Tc)}{q \cdot A} \quad (3)$$

In Equation (3), A is the area (=3.14×10⁻⁴ mm²).

By Equation (4), the thermal conductivity λ [W/mK] of the heat transfer member was calculated.

$$\lambda = \frac{t}{A \cdot R} \quad (4)$$

in Equation (4), t is the thickness [mm] of the heat transfer member.

Figure 11:
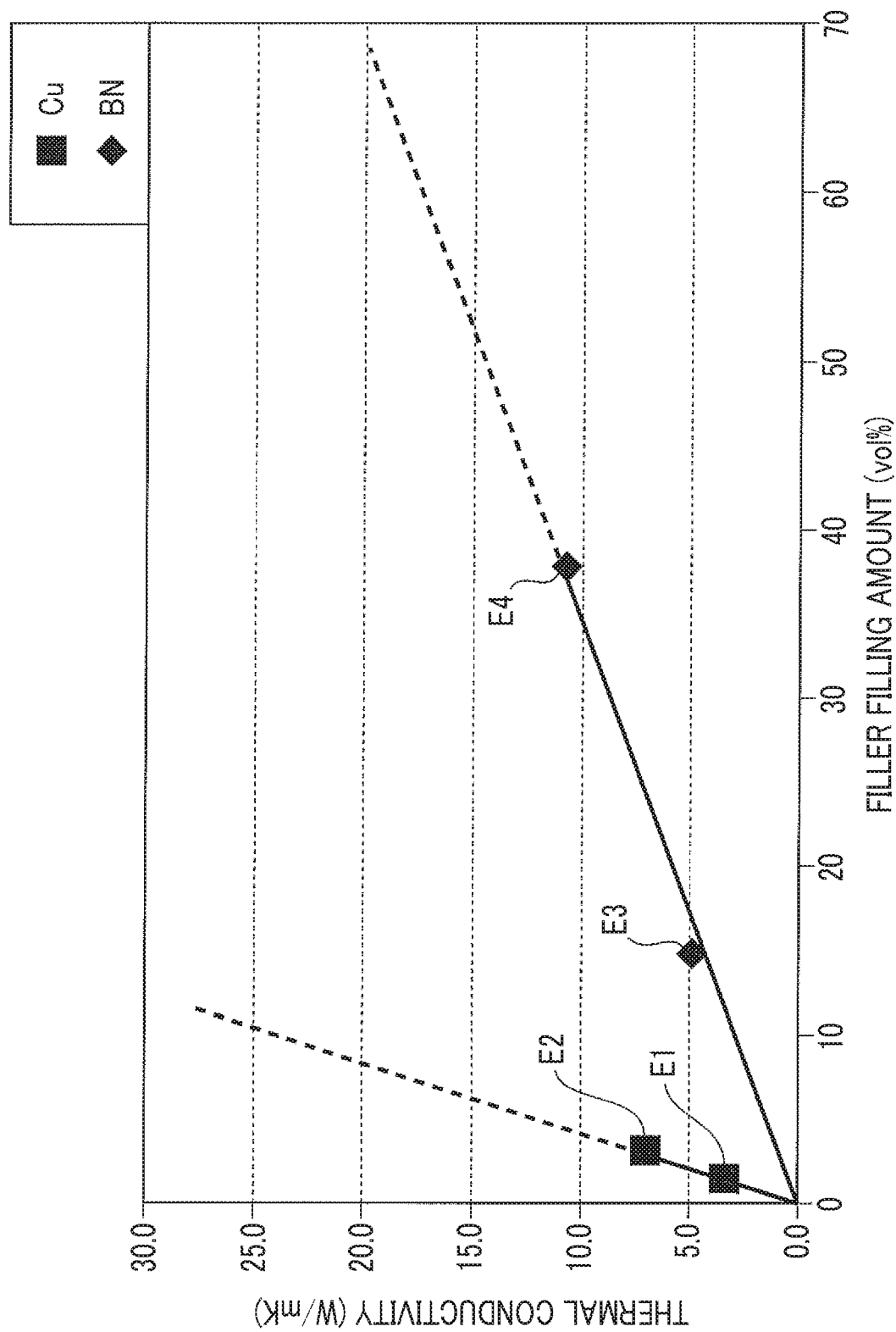
FIG. 11 is a graph showing the relationship between the filler filling amount and the thermal conductivity of heat transfer members of Examples 1 to 4.

FIG. 11 is a graph showing the relationship between the filler filling amount [vol %] and the thermal conductivity [W/mK] of the heat transfer members of Examples 1 to 4. In FIG. 11, points E1 and E2 respectively represent the heat transfer members of Examples 1 and 2 in which the core material of the filler is copper (Cu), and points E3 and E4 respectively represent the heat transfer members of Examples 3 and 4 in which the core material of the filler is boron nitride (BN).

As shown in FIG. 11 and Table 2, in the heat transfer members of Examples 1 and 2, the thermal conductivity was linearly improved by increasing the filling ratio of the fillers. Similarly, also in the heat transfer members of Examples 3 and 4, the thermal conductivity was linearly improved by increasing the filling ratio of the fillers.

Figure 12:
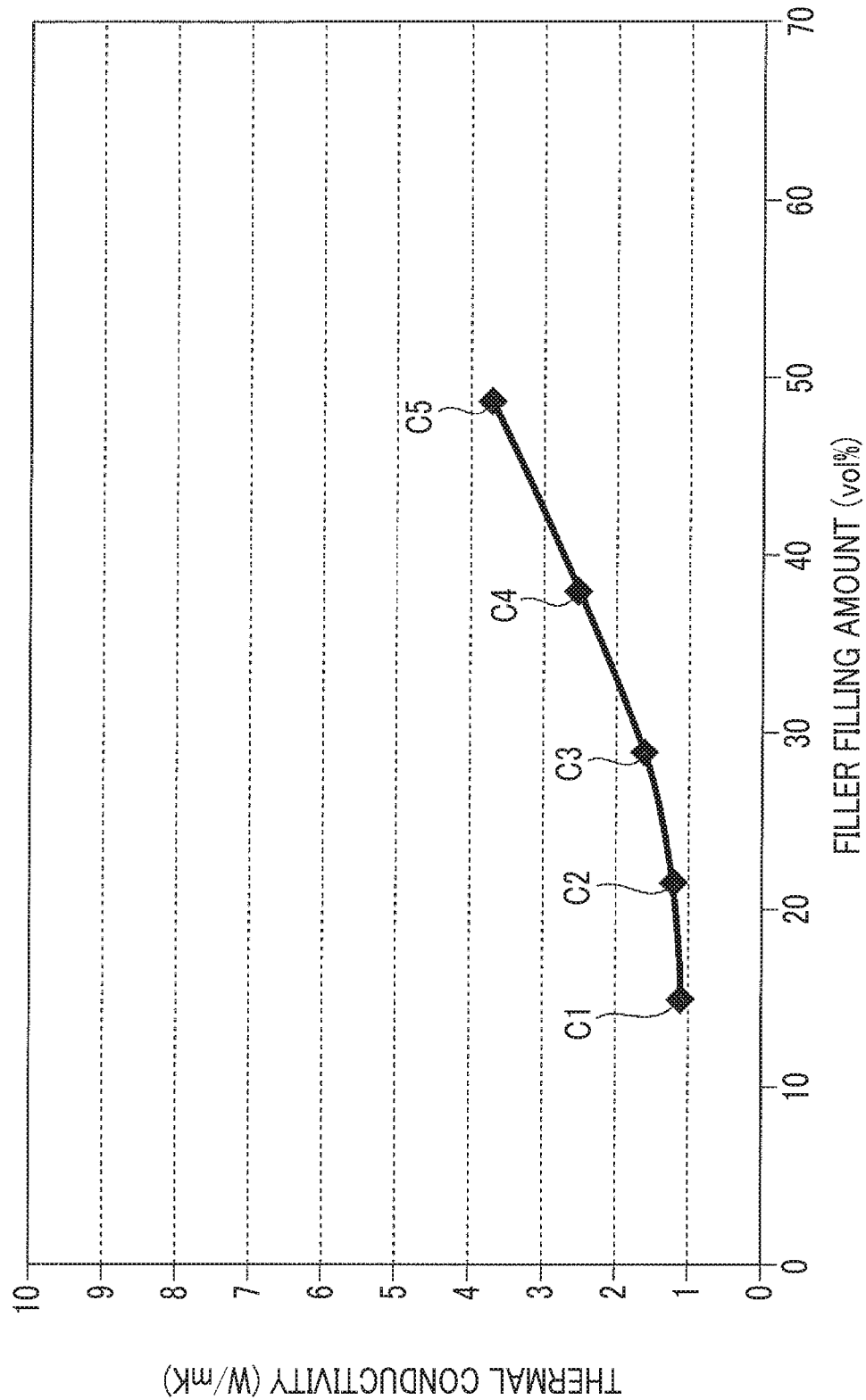
FIG. 12 is a graph showing the relationship between the filler filling amount and the thermal conductivity of heat transfer members of Comparative Examples 1 to 5.

FIG. 12 is a graph showing the relationship between the filler filling amount [vol %] and the thermal conductivity [W/mK] of the heat transfer members of Comparative Examples 1 to 5. In FIG. 12, points C1 and C5 respectively represent the heat transfer members of Comparative Examples 1 to 5. As shown in FIG. 12 and Table 2, in the heat transfer members of Comparative Examples 1 to 5, even when the filling ratio of the fillers was increased, a linear improvement in the thermal conductivity as in Examples 1 to 4 was not seen.

From the results described above, it was confirmed that the heat transfer members of Examples 1 to 4 have high thermal conduction properties even if the filling ratio of the fillers is suppressed.

The heat transfer member of Example 5 was manufactured in the following order. Fillers and spherical fillers were added to the silicone resin, and the resultant was stirred using a rotation and revolution mixer manufactured by Thinky Corporation for about two minutes. Here, as the core material of the filler, carbon fiber K223HM manufactured by Mitsubishi Plastics, Inc. having a diameter of about φ11 μm and a length of about 50 μm was used. As the spherical filler, alumina filler AO-509 manufactured by Admatechs Company Limited having a particle diameter of about 10 μm was used.

The silicone resin in which the fillers and spherical fillers were dispersed was poured into the mold and was subjected to a curing treatment in a hot air furnace at 120° C. for one hour. After curing the silicone resin, the silicone resin was cooled to room temperature, and releasing was performed to remove a heat transfer member manufactured as a result from the mold, thereby obtaining the heat transfer member of Example 5. The heat transfer member of Comparative Example 6 was manufactured in the same manner as the heat transfer member of Example 5 except that solely the spherical fillers were added without adding the fillers to the silicone resin. The thermal conductivity of the heat transfer member of Example 5 and the heat transfer member of Comparative Example 6 were measured by the method of measuring thermal conductivity.

Table 3 below shows the core material, density, and shape of the fillers included in the heat transfer members of Example 5 and Comparative Example 6, the material and density of the spherical fillers, and the resin and density of the resin matrix included in the heat transfer members described above. Table 4 below shows the weight ratio and volume ratio of the fillers, spherical fillers, and resin matrix included in the heat transfer members of Example 5 and Comparative Example 6, and the thermal conductivities of the heat transfer members described above.

TABLE 3

| | Filler | | | Spherical filler | | Resin matrix | |
|---|---|---|---|---|---|---|---|
| | Core material | Density [g/cm$^3$] | Shape | Material | Density [g/cm$^3$] | Resin | Density [g/cm$^3$] |
| Example 5 | CF | 2.2 | Fibrous | Al$_2$O$_3$ | 3.9 | silicone | 1.0 |
| Comparative Example 6 | — | — | — | Al$_2$O$_3$ | 3.9 | silicone | 1.0 |

TABLE 4

| | Weight ratio [wt %] | | | Volume ratio [vol %] | | | Thermal conductivity [W/mK] |
|---|---|---|---|---|---|---|---|
| | Filler | Spherical filler | Resin | Filler | Spherical filler | Resin | |
| Example 5 | 20 | 66 | 14 | 24 | 41 | 34 | 9.7 |
| Comparative Example 6 | 0 | 92 | 8 | 0 | 75 | 25 | 4.5 |

From the results described above, it was confirmed that the heat transfer member of Example 5 has high thermal conduction properties even when the filling ratio of the fillers and the spherical fillers was suppressed, compared to the heat transfer member of Comparative Example 6.

What is claimed is:

1. A filler for a heat transfer member, the filler comprising:
   a core material which is made of an inorganic material or a metal material having a thermal conductivity of 15 W/mK or more, and transfers heat; and
   an insulating film which includes a silicon oxide film and a diamond-like carbon film having electrical insulation properties, and covers the core material,
   wherein a dielectric breakdown voltage of the filler is 500 V or more.

2. The filler according to claim 1, wherein an innermost layer of the insulating film is the silicon oxide film.

3. A heat transfer member comprising:
   a resin matrix; and
   the fillers according to claim 1, the filler being dispersed in the resin matrix, wherein:
   the resin matrix has a sheet shape;

the filler is oriented along a thickness direction of the resin matrix;

a length of the filler along an orientation direction of the oriented and connected fillers is equal to or more than a thickness of the resin matrix; and a thermal conductivity of the heat transfer member is 3 W/mK or more.

4. A heat transfer member comprising:

a resin matrix; and the filler according to claim 1, the filler being dispersed in the resin matrix, wherein:

the resin matrix includes a spherical filler dispersed together with the filler, and has a sheet shape;

the resin matrix has a plurality of heat transfer paths penetrating through the resin matrix in a thickness direction of the resin matrix by the filler and the spherical filler; and a thermal conductivity of the heat transfer member is 3 W/mK or more.

* * * * *